United States Patent
Herbin et al.

(10) Patent No.: US 9,067,532 B2
(45) Date of Patent: Jun. 30, 2015

(54) ADJUSTMENT DEVICE OF A LIGHTING AND/OR SIGNALLING DEVICE OF A MOTOR VEHICLE, AND THE ASSEMBLY PROCEDURE OF SUCH A DEVICE

(75) Inventors: Cyril Herbin, Potelle (FR); Olivier Grebert, Ronchin (FR); Nicolas Simmet, Villeneuve d'Ascq (FR); Rémi Maliar, Saint Saulve (FR)

(73) Assignee: Valeo Vision, Bobigny (FR)

( * ) Notice: Subject to any disclaimer, the term of this patent is extended or adjusted under 35 U.S.C. 154(b) by 633 days.

(21) Appl. No.: 12/901,764

(22) Filed: Oct. 11, 2010

(65) Prior Publication Data

US 2011/0085346 A1    Apr. 14, 2011

(30) Foreign Application Priority Data

Oct. 12, 2009   (FR) ..................................... 09 57103

(51) Int. Cl.
*F21V 19/02* (2006.01)
*F21V 21/14* (2006.01)
*B60Q 1/068* (2006.01)

(52) U.S. Cl.
CPC ......... *B60Q 1/0683* (2013.01); *Y10T 29/49947* (2015.01)

(58) Field of Classification Search
CPC ....................... Y10T 29/49947; B60Q 1/0683
USPC .......... 362/523, 524, 459, 460, 464, 465, 512
See application file for complete search history.

(56) References Cited

U.S. PATENT DOCUMENTS

| 5,428,519 A | 6/1995 | Salmon et al. |
| 5,683,163 A * | 11/1997 | Goldschmidt et al. ........ 362/529 |
| 6,974,231 B2 * | 12/2005 | Burton .......................... 362/273 |
| 2011/0032716 A1 | 2/2011 | Burton |

FOREIGN PATENT DOCUMENTS

| DE | 102005037074 A1 | 2/2007 |
| EP | 580496 A1 | 1/1994 |
| EP | 1873445 A2 | 1/2008 |
| WO | 2009076438 A1 | 6/2009 |

* cited by examiner

*Primary Examiner* — Anh Mai
*Assistant Examiner* — Jessica M Apenteng
(74) *Attorney, Agent, or Firm* — Jacox, Meckstroth & Jenkins

(57) ABSTRACT

Adjustment device of the position of a first part of a lighting and/or signaling device of a motor vehicle in relation to a second part of this device. The adjustment device has a screw in mechanical liaison with the first part and in helical liaison with the second part, the helical liaison comprising: a sliding pivot liaison linking the screw to the second part, the screw being clipped into a bore which has an opening according to a first axis (X) and a conformation completed on the second part which matches the threads of the screw.

19 Claims, 6 Drawing Sheets

ADJUSTMENT DEVICE OF A LIGHTING AND/OR SIGNALLING DEVICE OF A MOTOR VEHICLE, AND THE ASSEMBLY PROCEDURE OF SUCH A DEVICE

CROSS-REFERENCE TO RELATED APPLICATIONS

This application claims priority to French Application No. 0957103 filed Oct. 12, 2009, which application is incorporated herein by reference and made a part hereof.

BACKGROUND OF THE INVENTION

1. Field of the Invention

The present invention relates to an adjustment device of the position of a first part of a lighting and/or signalling device of a motor vehicle in relation to a second part. It also concerns a lighting and/or signalling device comprising such an adjustment device. It also concerns a vehicle equipped with such a lighting and/or signalling device. Finally, it concerns an assembly procedure of such an adjustment device.

2. Description of the Related Art

It is normally arranged to proceed with the assembly of such a device by providing appropriate fittings on these fixed and mobile parts of the lighting and/or signalling device at the time of their manufacture; these fittings match a screw which is fitted at a later stage in order to complete the device.

For example, an adjustment device of the application EP 580 496, which is equivalent to U.S. Pat. No. 5,428,519, is known, for the orientation of a mobile part of a motor vehicle headlamp. The adjustment device makes it possible to adjust the position of a mobile part of a motor vehicle headlamp in relation to a fixed part. This adjustment device comprises a screw with a socket head, set within a housing linked to one of the parts and a thread which is in synch with a tapping linked to the other part. The socket head housing and the tapping are set respectively on two elements, each comprising means of assembly by a simple relative movement on homologous means of assembly situated on the respective parts.

If the means of assembly, by a simple related movement, make it possible to simplify the assembly of the headlamp and simplify the structure of the headlamp, this assembly and this structure remain relatively complex. In particular, such a headlamp requires a nut intended to fit with a screw and which must be fitted onto one of the parts, and the assembly of such a headlamp requires a step of screwing the screw into the nut in order to adjust the position of the mobile part in relation to the fixed part, this step making it possible to adjust the disconnection of the headlamp. The structure of such a headlamp and this screwing step generate costs.

SUMMARY OF THE INVENTION

The aim of the invention is to provide an adjustment device and an assembly procedure that make it possible to remedy the problem stated above, and improve the adjustment devices and assembly procedures known in a former state of the art. In particular, the invention proposes to reduce the complexity and cost of producing a lighting and/or signalling device. In particular, the invention proposes an adjustment device that has a simple structure and a simplified assembly procedure of such an adjustment device.

One object of the invention is a device which makes it possible to adjust the position of a first part of a lighting and/or signalling device of a motor vehicle in relation to a second part of the lighting and/or signalling device. The device comprises a screw in mechanical liaison with the first part and in helical liaison with the second part, wherein the helical liaison comprises the following:

a sliding pivot liaison linking the screw to the second part, the screw being clipped into a bore with an opening according to a first axis; and a shape completed on the second part and matching with threads of the screw.

Such a device presents a simplified structure without any nut.

The sliding pivot liaison may for example comprise a hoop made on the second part. Such a hoop makes it possible to ensure a satisfactory uptake of the radial stresses exercised by the conformation on the screw.

The mechanical liaison between the screw and the first part may for example be of point-shaped, linear annular, or socket head type. This particularly makes it possible to allow freedom of movement of the first part in relation to the second part, and in particular to allow a rotation of the first part in relation to an axis of rotation. The mechanical liaison preferably comprises a fork completed on the first part and at least two portions at least significantly in truncated spheres, or at least significantly frustoconical on the screw. Such a structure makes it possible to achieve a cheaper socket head liaison.

The first part or the second part may for example comprise at least one reflector of the lighting and/or signalling device.

According to one variant of completion:

the first part comprises at least one reflector of the device and the second part comprises a support part of the reflector; or the second part comprises at least one reflector of the lighting and/or signalling device and the first part comprises a support part of the reflector.

The support part may support the reflector directly or indirectly. For example, the lighting and/or signalling device may comprise a housing closed by a transparent closing window. The housing then contains a reflector associated to a light source. This reflector is supported inside the housing by the interdependent support part of the housing. The support part may for example be fixed to the housing. According to another variant of realization, the support part supports the housing itself inside which the reflector is lodged, and thus indirectly supports the reflector. The support part may then be used to be fixed to a structure of a motor vehicle. There are also variants of realization where the reflector and the housing are one and the same part, with an inside surface of the housing being formed and aluminum coated in order to ensure the function of a reflector.

The first part may be mobile in relation to the second part in rotation around a second axis, preferably at least significantly orthogonal to the first axis. This is a simple means of conversion of the component of transfer of the movement of the screw to a rotation movement of the first part.

According to one variant of realization, the first part is articulated in rotation on the second part. For example, the second part comprises a first means of articulation intended to match a second means of articulation arranged on the first part.

The adjustment device may comprise means of pre-positioning of the assembly of the first part onto the second part. These means make it possible to ensure the reliability of the assembly, and ensure that it is secure enough to avoid untimely separations of the fixed and mobile parts during the assembly steps.

The conformation may extend between 45 degrees and 180 degrees around the first axis, preferably 180°.

According to one embodiment of the invention, the lighting and/or signalling device of a motor vehicle comprises an adjustment device as defined above.

According to another embodiment of the invention, the motor vehicle comprises a lighting and/or signalling device as defined above.

According to still another embodiment of the invention, the assembly procedure of an adjustment device as defined above comprises the following steps:

positioning of the screw longitudinally according to the first axis in relation to the second part, then clipping of the screw onto the second part.

Such an assembly procedure does not require a step of screwing the screw into a nut, which makes it possible to simplify the procedure and make it cheaper to complete.

The positioning step of the screw may comprise a sub-step of setting up a stop, and a sub-step of moving the screw to its contact against the stop. This sub-step makes it possible to simply and quickly adjust the position of the first part in relation to the second part during assembly.

The clipping step may take place by transferring the screw according to one axis at least significantly perpendicular to the first axis, or by rotating the screw according to one axis perpendicular to the first axis.

After clipping the screw, the assembly procedure may comprise a step of fixing the first part onto the screw. The assembly of the first part onto the second part by clipping is fast and simple.

The fixation step may comprise a clipping of the screw onto the first part, and a clipping of the first part onto the second part. The assembly of the screw onto the first part by clipping is fast and simple.

A pre-clipping of the screw onto the first part may take place before the clipping of the first part onto the second part and the final clipping of the screw onto the first part. This step makes it possible to make the assembly reliable, and ensure that it is secure enough to avoid untimely separations of the fixed and mobile parts during the assembly steps.

These and other objects and advantages of the invention will be apparent from the following description, the accompanying drawings and the appended claims.

BRIEF DESCRIPTION OF THE ACCOMPANYING DRAWINGS

The attached drawing represents, by way of example, one mode of realisation of a lighting and/or signalling device for a motor vehicle according to the invention.

DETAILED DESCRIPTION OF THE PREFERRED EMBODIMENTS

Figure 1:
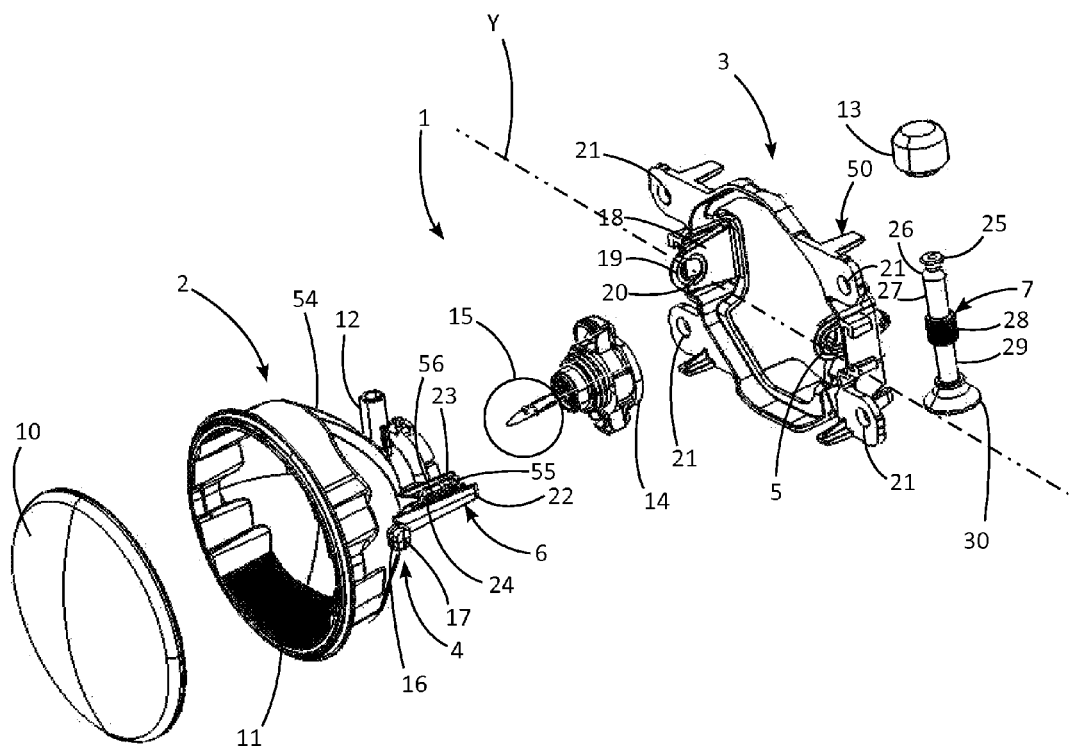
FIG. 1 is a blown-up perspective view of one mode of realization of a lighting and/or signalling device according to the invention.
Figure 2:
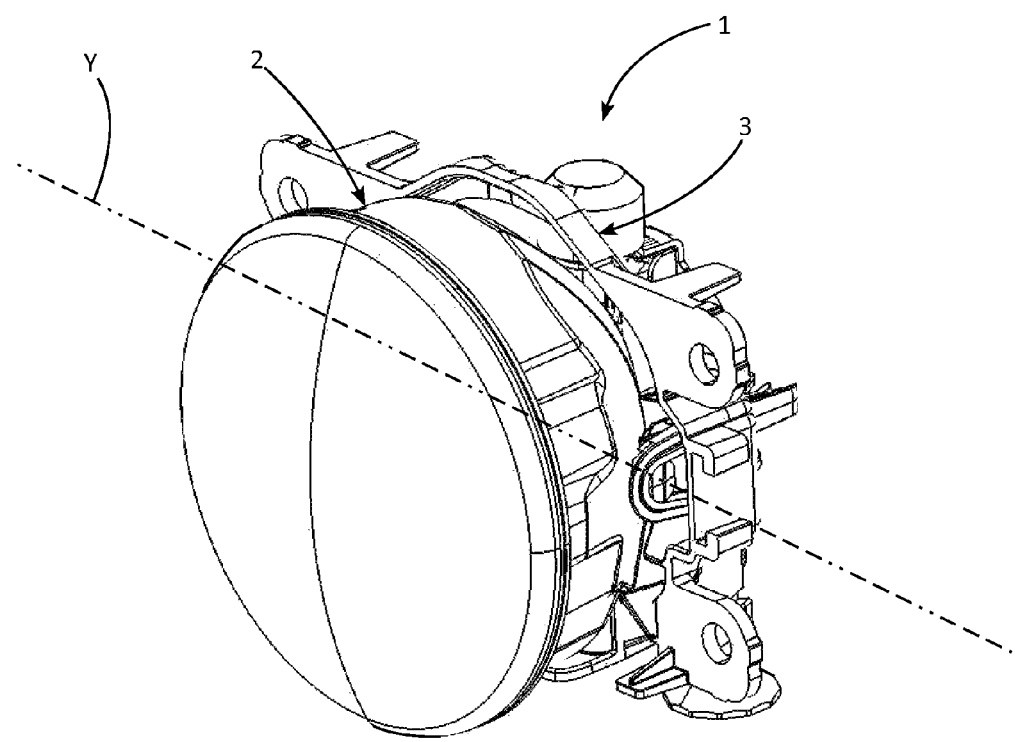
FIG. 2 is a front perspective view of the mode of realization of the lighting and/or signalling device according to the invention.
Figure 3:
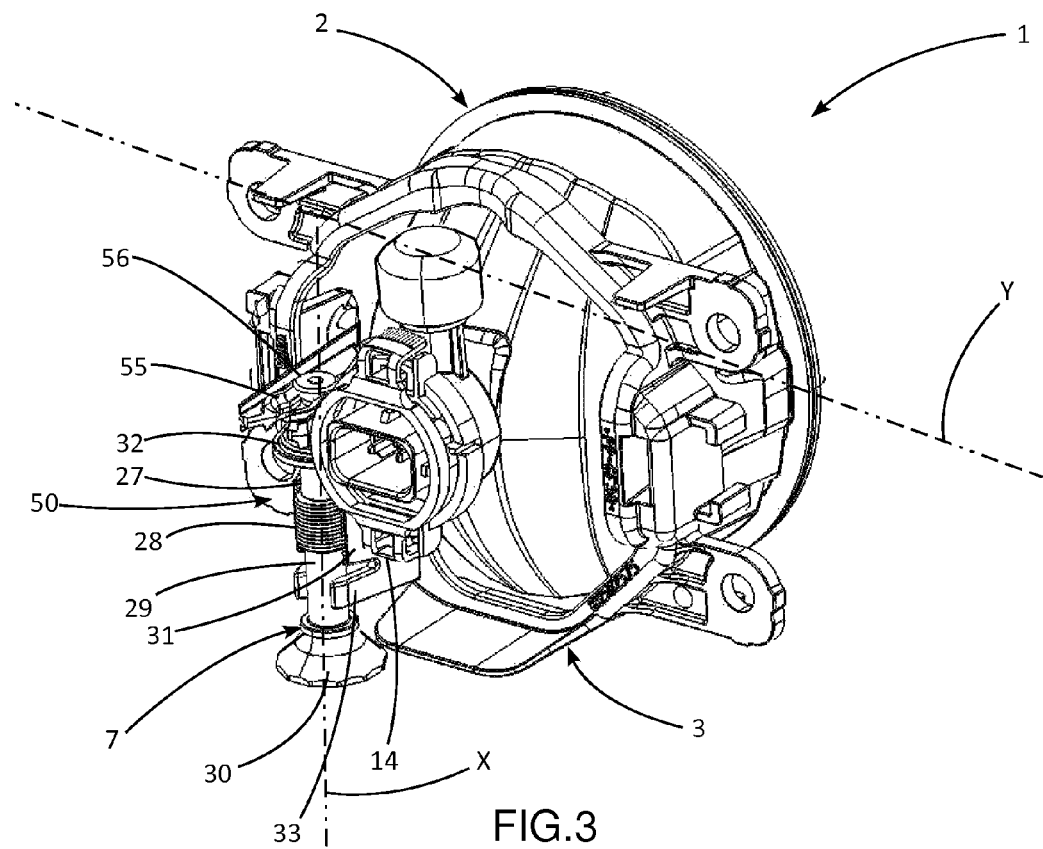
FIG. 3 is a rear perspective view of the mode of realization of the lighting and/or signalling device according to the invention.

The adjustment device 50, represented on FIGS. 1 to 3, is intended to make it possible to adjust the position of a first part 2 of a lighting and/or signalling device 1 in relation to a second part 3 of the lighting and/or signalling device. The adjustment device may comprise the first part and/or the second part.

The adjustment device comprises the following:

a screw 7;

an element 6 in mechanical liaison with the screw and in mechanical liaison with the first part; and a conformation 51 in helical liaison with the screw and in mechanical liaison with the second part.

Preferably, the helical liaison is provided by:

a sliding pivot liaison linking the screw to the second part, the sliding pivot liaison comprising a clipping of the screw into a bore 52 which has an opening 53 according to a first x-axis; and the conformation 51 completed on the second part and on the first part, matching the threads 28 of the screw.

Preferably, as represented on the figures, the sliding pivot liaison is provided by:

a hoop 32 presenting an opening intended to allow a first cylinder part 27 of the screw to pass, at least partially surrounding it; and feet 33 forming a bore 52 intended to house a second cylindrical part 29 of the screw, at least partially surrounding it, and the bore presents an opening 53 according to its x-axis.

Subsequently, one only describes the represented mode of realization, in which the first part 2 comprises a unit including a housing 54, a reflector 11 and a window 10 of the lighting and/or signalling device, and the second part 3 comprises a fixation plate 3 in order to fix the lighting and/or signalling device onto the structure of the motor vehicle. Alternatively, the first part may consist of a mobile reflector in relation to a light source, or again, it may mainly comprise a mobile reflector in relation to a light source. However, a cinematic inversion is quite possible, that is, it may be the second part which comprises a unit including a housing 54, a reflector 11 and a window 10 of the lighting and/or signalling device, or the second part which consists of a mobile reflector in relation to a light source, or the second part which mainly comprises a mobile reflector in relation to a light source.

The reflector and the housing may be formed in one and the same part, an interior surface of the housing 54 being formed and aluminum coated to assure the function of reflector 11.

Figure 9:
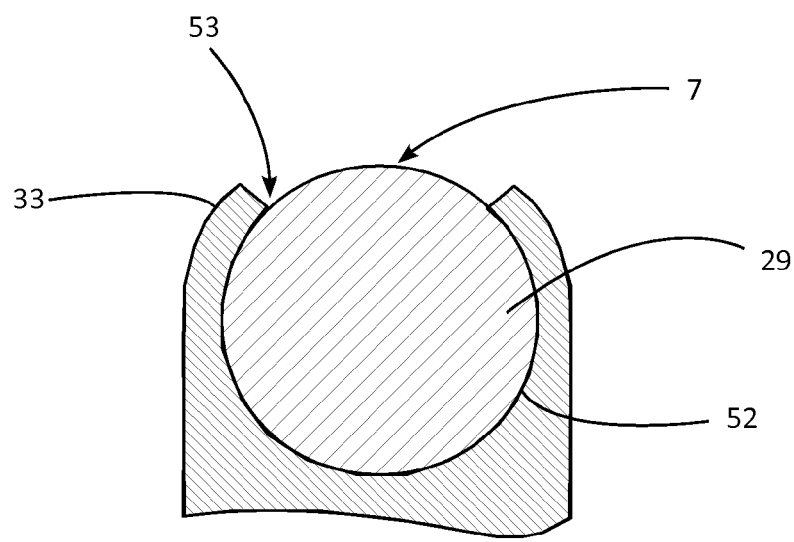
FIG. 9 is a partial section of the mode of realization of the lighting and/or signalling device according to the invention in plan IX-IX of FIG. 7.

As represented on FIG. 9, the feet 33 are completed in elastic material, for example in synthetic material (plastic material), so that the cylindrical part 29 of the screw can be clipped into the bore 52 across the opening 53 by deformation of the feet 33.

Preferably, the first and second cylindrical parts are arranged on the screw on either side of a threaded portion 28.

In a first variant not represented, it is possible to do without the hoop 32.

In a second variant not represented, it is possible that the bore 52 may be completed at the level of the threaded portion 28, in which case the tops of the threads of the screw are then related to the bore.

By means of a sliding pivot liaison between a first part and a second part, one understands that the degrees of cinematic freedom between the two parts are limited to the transfer of the first part in relation to the second part according to one axis, and to the rotation of the first part in relation to the second part according to the same axis.

Figure 8:
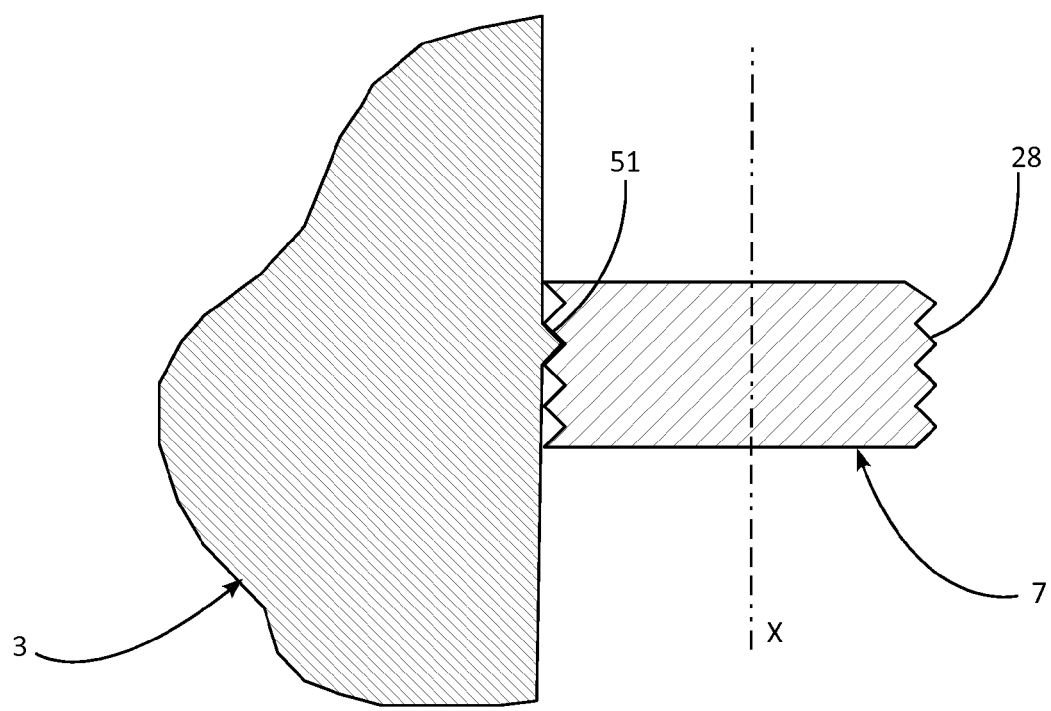
FIG. 8 is a partial section of the mode of realization of the lighting and/or signalling device according to the invention in a plane passing through the x-axis and parallel to the representation plan of FIGS. 6 and 7.

Preferably, as represented on FIG. 8, the conformation comprises a projection 51, in particular a projection of triangular section, appearing in a hollow of the threaded portion 28 of the screw.

In a variant not represented, the conformation comprises several projections onto the second part 3, in particular several projections of triangular section, arranged at regular intervals corresponding to the pitch of the screw according to the x-axis.

Preferably, it extends between 45 degrees and 180 degrees around the first axis. The conformation extends around the x-axis by an angle below or equal to about 180° in order to enable the clipping of the screw. According to one variant of realization, the conformation extends around the x-axis by an angle equal to about 180°.

For example, the conformation is completed in a hollow shape 31, completed on the second part. Preferably, this hollow shape is a cylindrical portion of bore, in particular a semi-cylindrical bore. This hollow shape is arranged between the hoop 32 and the feet 33.

The mechanical liaison between the screw 7 and the first part may be of the point-shaped type (in particular bilateral point-shaped), or linear annular, or socket head type.

In the whole of this document, the term point-shaped liaison between a first part and a second part means that the degree of cinematic freedom alone, which is prohibited between the two parts, is the transfer of the first part in relation to the second part according to one axis. In the point-shaped bilateral liaison, this transfer is prohibited according to both directions.

In the whole of this document, the term linear annular liaison between a first part and a second part means that degrees of cinematic freedom alone, prohibited between the two parts, are the transfers of the first part in relation to the second part according to two orthogonal axes.

In the whole of this document, the term socket head liaison between a first part and a second part means that the degrees of cinematic freedom alone, authorized between the two parts, are the rotations of the first part in relation to the second part according to three orthogonal axes.

If the first part is linked by a liaison pivot to the second part and if the second part is linked by a helical liaison to the screw, the two latter types of liaison mentioned lead to a pre-constraint of the device.

In practice, as represented on the figures, one may simply complete a liaison of socket head type with play between the screw 7 and the first part thanks to a fork 6 completed on an interdependent element of the first part and two portions at least significantly in truncated spheres, or at least significantly frustoconical 25 and 26 in screw-to-screw on the screw 7. The fork comprises two arms 22, 23 which define an opening 24 in which the screw 7 is clipped between the two portions 25, 26.

In order to avoid any undesired movement of the first part in relation to the second part once the position of the first part in relation to the second part has been adjusted, the screw and the second part tighten together at the level of the sliding pivot liaison and/or the screw and the second part tighten together at the level of the interface between the conformation and the threaded portion, and/or the interface between the screw and element 6.

The screw 7 also comprises a head 30 which makes it possible to maneuver the screw in rotation by direct manual action or via an operator's tool, or by the action of an automatic maneuvering system.

Thanks to such an adjustment device, one understands that, by a rotation action of the screw 7 around the x-axis in relation to the second part, one achieves a displacement by transferring the screw in relation to this x-axis and, consequently, a displacement of the first part in relation to the second part. Thus, it is possible to adjust the disconnection of the lighting and/or signalling device.

One understands that, due to the fact of the geometry of the conformation that acts on the threads of the threaded portion during the rotation of the screw, certain mechanical actions may tend to eject the screw out of the bore 52. In order to limit this effect, one positions the bore 52 as far as possible from the conformation.

The reflector and the window are preferably fixed onto the housing, as well as a bulb holder 14 supporting a bulb 15.

The second part 3 preferably comprises a fixation plate that fixes the lighting and/or signalling device to a motor vehicle structure. In order to do this, the plate comprises, for example, ears equipped with drillings 21.

Preferably, the first part is articulated in rotation on the second part. For example, the second part comprises a first means of articulation 5 intended to match a second means of articulation 4 arranged on the first part.

The second means of articulation may comprise bearings 16, and the first means of articulation may comprise ears 18 equipped with holes 19 which define a y-axis and are intended to house the bearings.

Preferably, the ears present sides 20 which form a V in order to guide the bearings towards the holes 19. Preferably again, the ends of the bearings present slopes 17 in order to bend the ears 18 as and when one approaches the first part of the second part and thus facilitate the clipping of the bearings 16 into the holes 19.

For example, the y-axis is at least significantly orthogonal to the x-axis.

The adjustment device may comprise means of pre-positioning the assembly or pre-clipping of the first part onto the second part. In order to do this, the opening 24 in the fork 6 is shaped so that it can be clipped onto the screw, since the bearings 16 are not yet in the holes 19, but only in support between the two ears 18 and the sides 20.

According to the invention, a lighting and/or signalling device comprises an adjustment device as described previously. The lighting and/or signalling device is, for example, a motor vehicle foglamp device.

One mode of execution of an assembly procedure of an adjustment device according to the invention is described hereafter with reference to FIGS. 4 to 7.

Figure 4:
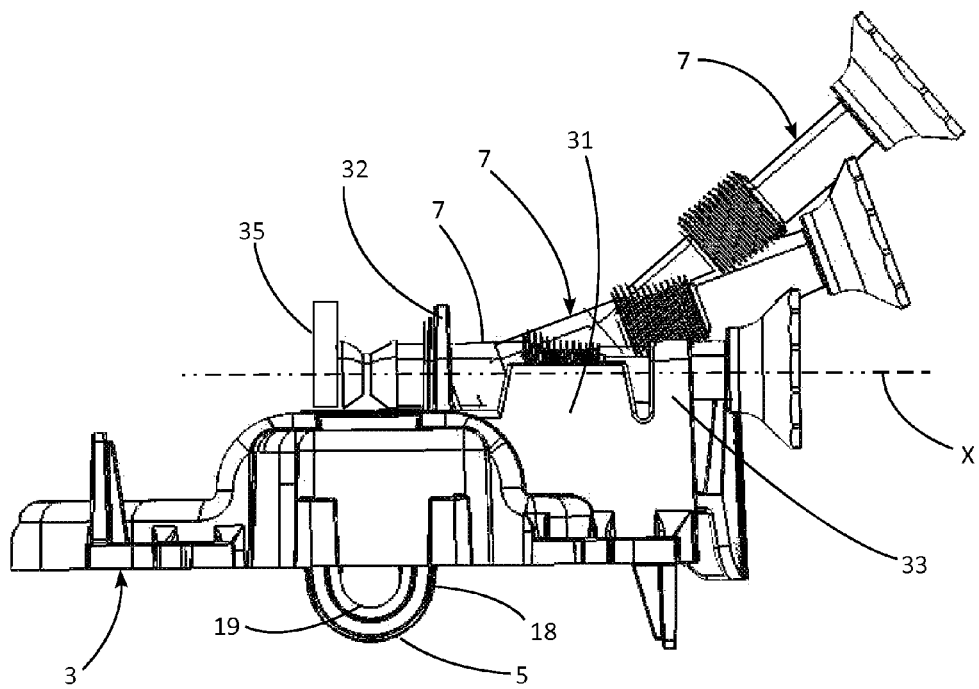
FIG. 4 is a view of a first assembly step of the mode of realization of the lighting and/or signalling device according to the invention.

In a first step represented in FIG. 4, one supplies a second part 3 and a screw 7, and one positions the screw longitudinally according to the first x-axis in relation to the second part. The term "one positions the screw longitudinally according to the first x-axis in relation to the second part" means that one puts the screw in a position such that one or more points of the screw are found to be in a certain position according to this x-axis without, however, this or these points being found to be necessary on the x-axis and without the screw being necessarily found to be oriented according to this x-axis. For example, in the mode of realization represented, in the first step, one supplies a stop 35, this stop being positioned in relation to the second part 3, and one brings the screw, for example one end of the screw, into contact against this stop. In this position represented in FIG. 4, the screw is not oriented according to the x-axis. Thus, in this mode of realization, it is particularly a point of the end of the screw coming into contact with the stop which is set in position according to the first x-axis in relation to the second part. In order to position the screw, one may move it freely in the hoop 32.

Figure 5:
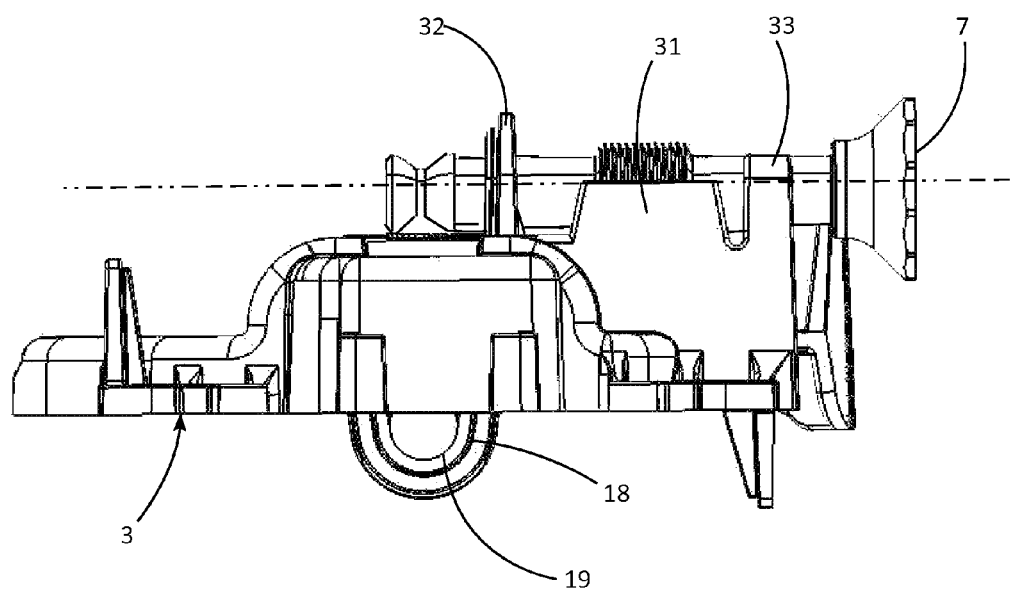
FIG. 5 is a view of a second assembly step of the mode of realization of the lighting and/or signalling device according to the invention.

In a second step represented on FIG. 5, one clips the screw onto the second part, for example by deformation of the feet 33. The stop 35 previously used may then be erased. In effect, during clipping, the threads of the threaded portion are matched with the conformation 51, so that the screw may no longer be displaced in transfer according to the x-axis in relation to the second part, except when it is maneuvered in rotation around this axis. Clipping may take place by transferring the screw according to one axis, at least significantly perpendicular to the x-axis, or by rotating the screw according to one axis perpendicular to the x-axis.

Figure 6:
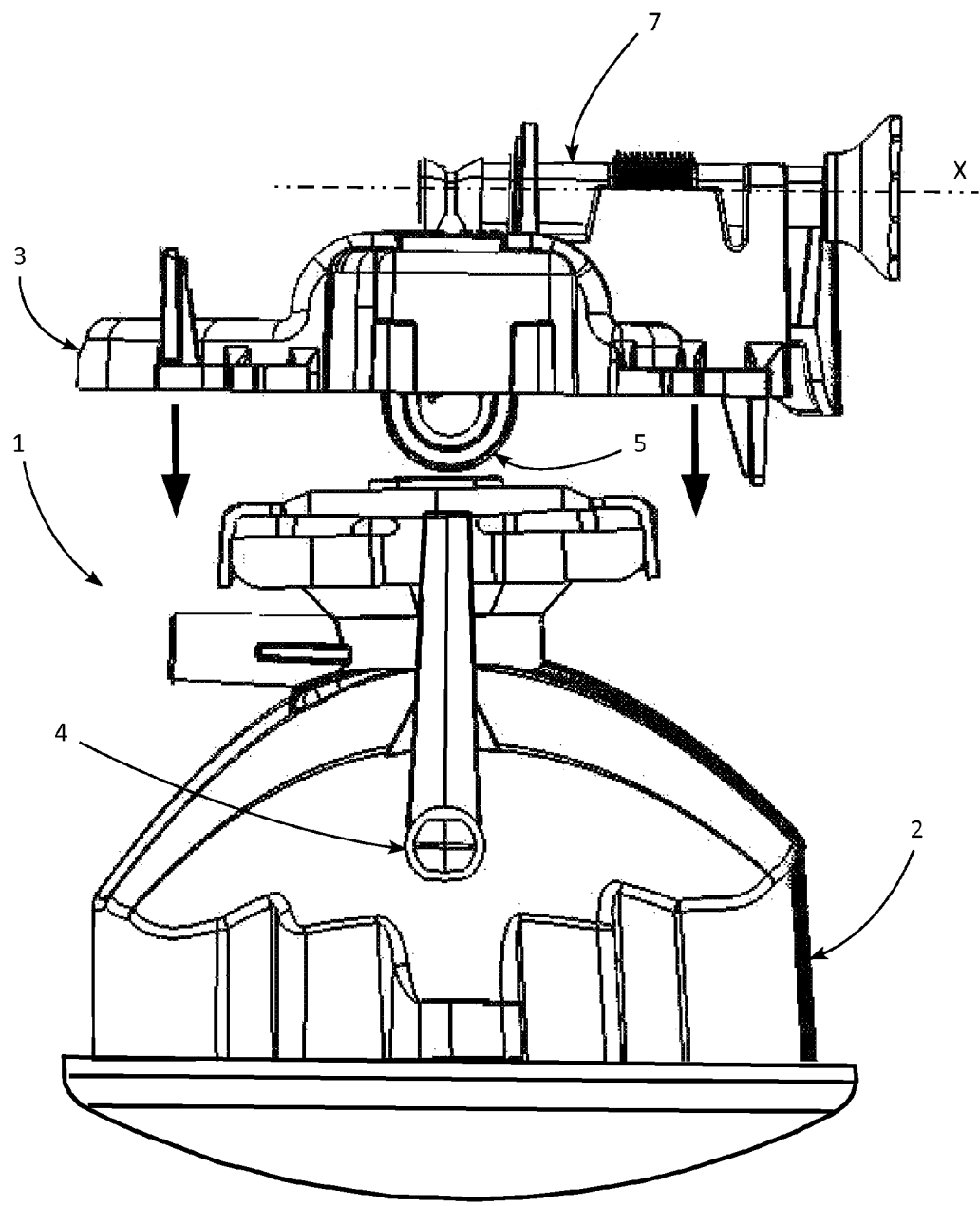
FIG. 6 is a view of a third assembly step of the mode of realization of the lighting and/or signalling device according to the invention.

In a third step represented on FIG. 6, one carries out a step of pre-assembly or pre-clipping of the first part 2 onto the second part 3. In order to do this, one leads the bearings 16 of the first part between the ears 18 of the second part and the sides 20 completed in these ears, and one clips the screw 7 into a first notch 55 completed in the opening 24 of the fork 6. Following this step, the first part and the second part are assembled together, but they are not yet in a functional assembly position. This step is optional.

Figure 7:
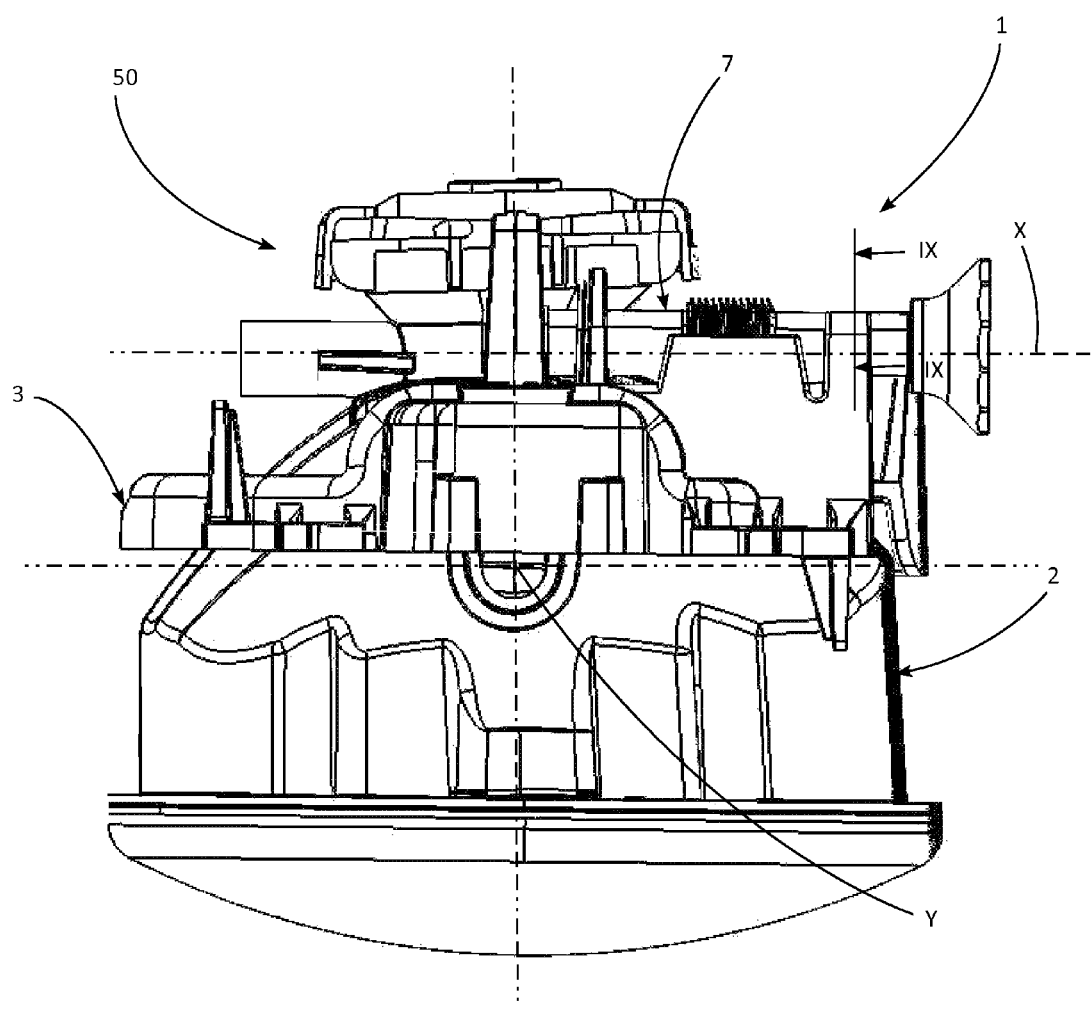
FIG. 7 is a view of a fourth assembly step of the mode of realization of the lighting and/or signalling device according to the invention.

In a fourth step represented on FIG. 7, one carries out a step of final clipping of the first part 2 onto the second part 3. In order to do this, one leads the bearings 16 of the first part into the holes 19 of the ears 18 of the second part, and one clips the screw 7 into a second notch 56 completed in the opening 24 of the fork 6. Following this step, the first part and the second part are assembled together and they are in a functional assembly position.

One understands that the adjustment device and the assembly procedure according to the invention present several advantages in relation to the devices and known procedures of the former art. In particular, the adjustment device according to the invention does not present any nut, which makes it possible to simplify its structure and completion cost. In particular again, the assembly procedure according to the invention makes it possible to simplify, indeed eliminate, the step of positioning the first part in relation to the second part, which makes it possible to simplify the procedure and its commissioning cost. In effect, in the assembly procedures according to the former art, there is a screwing step of the screw into a nut in order to adjust the position of the first part in relation to the second part and in order to consequently adjust the disconnection of the lighting device. In the assembly procedure according to the invention, this screwing step is eliminated. It is replaced by a step of placing a screw in position according to an axis, then by a step of clipping the screw into this position. Consequently, thanks to the invention, the production of an adjustment device is simplified and its cost is reduced.

In the whole of this document, the term "at least significantly parallel", means "parallel" or "significantly parallel", the term "at least significantly perpendicular" means "perpendicular" or "significantly perpendicular", the term "at least significantly orthogonal" means "orthogonal" or "significantly orthogonal", the term "at least significantly frustoconical" means "frustoconical" or "significantly frustoconical", and the term "at least in truncated spheres" means "truncated spheres" or "significantly truncated spheres".

In the whole of this document, the term sliding pivot liaison between a first part and a second part, means that the degrees of cinematic freedom between the two parts are limited to the transfer of the first part in relation to the second part according to one axis, and to the rotation of the first part in relation to the second part according to the same axis. This rotation and this transfer are linked together, that is, not independent.

While the procedure herein described, and the forms of apparatus for carrying this procedure into effect, constitute preferred embodiments of this invention, it is to be understood that the invention is not limited to this precise procedure and forms of apparatus, and that changes may be made in either without departing from the scope of the invention, which is defined in the appended claims.

What is claimed is:

1. An adjustment device for adjusting a relative position of a first part of a lighting or signalling device of a motor vehicle in relation to a second part of said lighting or signalling device, comprising a screw in mechanical connection with said first part and in helical connection with said second part, wherein said helical connection comprises the following:
    a sliding pivot linking said screw to said second part, said screw being adapted to pivot to a closed position and clipped into a bore which has an opening according to a first axis (X); and
    said second part having complementary thread(s) that mate with the threads of said screw;
    said sliding pivot permitting said screw to be pivoted between an open position and said closed position and a threaded connection or mating of said thread(s) of said second part to said thread(s) of said screw being completed when said screw is clipped into said bore;
    wherein said second part comprises a hollow shape defining a semi-cylindrical bore having at least one projection that mates with threads on said screw to provide said helical connection;
    wherein at least one of said first part or said second part comprises at least one reflector that responsive to the movement of said screw.

2. The adjustment device according to claim 1, wherein said sliding pivot comprises a hoop completed on said second part.

3. The adjustment device according claim 2, wherein the first part or the second part comprises at least one reflector of the lighting or signalling device.

4. An assembly procedure of an adjustment device according to claim 2 on a lighting or signalling device of a motor vehicle, including a first part which may be displaced in relation to a second part, wherein said assembly procedure comprises the following steps:
    positioning of the screw longitudinally according to the first axis in relation to the second part; then
    clipping of the screw onto the second part.

5. The adjustment device according to claim 1, wherein said mechanical connection between said screw and said first part is of the point-shaped, or linear annular, or socket head type.

6. The adjustment device according to claim 5, wherein said mechanical connection between said screw and said first part comprises a fork completed on said first part, and at least two portions at least significantly in truncated spheres or at least significantly frustoconical on said screw.

7. The adjustment device according claim 1, wherein the first part or the second part comprises at least one reflector of the lighting or signalling device.

8. The adjustment device according to claim 7, wherein:
the first part comprises at least one reflector of the device and the second part comprises a support part of the reflector; or
the second part comprises at least one reflector of the lighting or signalling device and the first part comprises a support part of the reflector.

9. The adjustment device according claim 1, wherein the first part is mobile in relation to the second part in rotation around a second axis (Y), preferably at least significantly orthogonal to the first axis (X).

10. The adjustment device according to claim 1, wherein said adjustment device comprises means of pre-positioning of the assembly of the first part on the second part.

11. The adjustment device according to claim 1, wherein the conformation extends preferably between 45 degrees and 180 degrees around the first axis.

12. A lighting or signalling device of a motor vehicle comprising an adjustment device according to one claim 1.

13. An assembly procedure of an adjustment device according to claim 12 on a lighting or signalling device of a motor vehicle, including a first part which may be displaced in relation to a second part, wherein said assembly procedure comprises the following steps:
positioning of the screw longitudinally according to the first axis in relation to the second part; then
clipping of the screw onto the second part.

14. An assembly procedure of an adjustment device according to claim 1 on a lighting or signalling device of a motor vehicle, including a first part which may be displaced in relation to a second part, wherein said assembly procedure comprises the following steps:
positioning of the screw longitudinally according to the first axis in relation to the second part; then
clipping of the screw onto the second part.

15. The assembly procedure according to claim 14, wherein the positioning step of the screw comprises a sub-step of setting in place a stop, and a sub-step of displacement of the screw as far as its contact against the stop.

16. The assembly procedure according to claim 14, wherein the clipping step is completed by transferring the screw according to an axis which is at least significantly perpendicular to the first axis, or by rotating the screw according to an axis perpendicular to the first axis.

17. The assembly procedure according to claim 14, wherein said assembly procedure comprises, after clipping the screw, a step of fixing the first part onto the screw.

18. The assembly procedure according to claim 17, wherein the fixation step comprises a clipping of the screw onto the first part, and a clipping of the first part onto the second part.

19. The assembly procedure according to claim 18, wherein a pre-clipping of the screw onto the first part takes place before the clipping of the first part onto the second part, and the final clipping of the screw onto the first part.

* * * * *

UNITED STATES PATENT AND TRADEMARK OFFICE
CERTIFICATE OF CORRECTION

| | | |
|---|---|---|
| PATENT NO. | : 9,067,532 B2 | Page 1 of 1 |
| APPLICATION NO. | : 12/901764 | |
| DATED | : June 30, 2015 | |
| INVENTOR(S) | : Cyril Herbin et al. | |

It is certified that error appears in the above-identified patent and that said Letters Patent is hereby corrected as shown below:

In the Claims

Claim 1, Column 8, line 40, after "that" insert -- is --.

Signed and Sealed this
First Day of December, 2015

Michelle K. Lee
*Director of the United States Patent and Trademark Office*